(12) United States Patent
Dettinger et al.

(10) Patent No.: US 7,188,105 B2
(45) Date of Patent: Mar. 6, 2007

(54) QUERY ABSTRACTION HIGH LEVEL PARAMETERS FOR REUSE AND TREND ANALYSIS

(75) Inventors: Richard D. Dettinger, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 10/268,450

(22) Filed: Oct. 10, 2002

(65) Prior Publication Data

US 2004/0073539 A1 Apr. 15, 2004

(51) Int. Cl.
  G06F 17/30 (2006.01)
  G06F 17/00 (2006.01)
  G06F 9/44 (2006.01)
  G06F 9/45 (2006.01)

(52) U.S. Cl. ............... 707/4; 707/101; 717/106; 717/136

(58) Field of Classification Search ........... 707/1–10, 707/100–104.1, 200–206; 717/106–109, 717/114–119, 136
See application file for complete search history.

(56) References Cited

U.S. PATENT DOCUMENTS

| | | | |
|---|---|---|---|
| 6,006,224 A * | 12/1999 | McComb et al. | 707/5 |
| 6,272,488 B1 | 8/2001 | Chang et al. | |
| 6,345,271 B1 * | 2/2002 | Dempsey et al. | 707/4 |
| 6,430,556 B1 * | 8/2002 | Goldberg et al. | 707/4 |
| 6,594,658 B2 * | 7/2003 | Woods | 707/5 |
| 6,725,227 B1 | 4/2004 | Li | |
| 6,820,135 B1 * | 11/2004 | Dingman et al. | 709/246 |

* cited by examiner

*Primary Examiner*—Joon Hwan Hwang
(74) *Attorney, Agent, or Firm*—Patterson & Sheridan, LLP; William J. McGinnis

(57) ABSTRACT

The present invention is generally directed to a method, article of manufacture, and system for generating and executing queries with high level parameter markers having one or more associated query conditions. In contrast to conventional parameter markers that are limited to association with simple values of a query condition, high level parameter markers may be associated with a set of entire query conditions.

21 Claims, 16 Drawing Sheets

```
                    SEARCH MAIN
         USER : RESEARCHER 1
502      SEARCH : 40 YEAR OLDS WITH HEART CONDITIONS
         SEARCH CONDITIONS

[ACTION]   [NOT]    [ CONDITION ]    [COMPONENT]
          DELETE      ☐      (AGE > 40)
          DELETE AND  ☐      (AGE < 50)
                                                              510
         [ADD CONDITION]─504   [ADD COMPONENT]─506

OUTPUT
         [CHANGE DATA]─512   [CHANGE FORMAT]─514

SEARCH
         [RUN]─516  [SAVE]─518   [SAVE AS COMPONENT]─520
         [SHOW SQL]─522            [CANCEL]─524
```

*FIG. 5A*

```
                ADD SEARCH CONDITION
         USER : RESEARCHER 1
530      SEARCH : UNSAVED

CHOOSE ONE CONDITION CATEGORY AND VALUE AND CLICK NEXT. IF YOU KNOW THE ICD-9
         OR DRG VALUE TO USE, TYPE IT IN AND CLICK NEXT TO CREATE THE CONDITION.

⦿  DEMOGRAPHIC          [AGE        ▼]─532
         ○  LABORATORY RESULTS   [DERIVED RESULTS ▼]─534
         ○  REPORTS              [CARDIOLOGY ▼]─536
         ○  DIAGNOSTIC USING ICD-9  VALUE: [    ] [BROWSE]─538

[NEXT]─540  [CANCEL]─542
```

*FIG. 5B*

SEARCH MAIN
USER : RESEARCHER 1
SEARCH : 40 YEAR OLDS WITH HEART CONDITIONS

SEARCH CONDITIONS

| ACTION | NOT | CONDITION | COMPONENT |
|---|---|---|---|
| DELETE | ☐ | (ICD9 = 410) | |
| DELETE | OR ☐ | (ICD9 = 412) | |

[ADD CONDITION] —504   [ADD COMPONENT] —506

OUTPUT

[CHANGE DATA] —512   [CHANGE FORMAT] —514

SEARCH

[RUN] —516  [SAVE] —518   [SAVE AS COMPONENT] —520

[SHOW SQL] —522   [CANCEL] —524

*FIG. 5C*

SAVE COMPONENT
USER : RESEARCHER 1
SEARCH : UNSAVED

NAME: [HEART CONDITIONS] —552

DESCRIPTION: [DIAGNOSTIC CODES FOR HEART CONDITIONS] —554

☐ MAKE PUBLIC —556

[OK] —540   [CANCEL] —542

*FIG. 5D*

ALL COMPONENTS

USER : RESEARCHER 1

SEARCH : UNSAVED

| NAME | DESCRIPTION | ACTION | ACCESS |
|---|---|---|---|
| HEART CONDITIONS | DIAGNOSTIC CODES FOR HEART CONDITIONS | ADD COPY DELETE EDIT | PUBLIC |
| CNS DISEASES | DIAGNOSTIC CODES FOR CENTRAL NERVOUS SYSTEM CONDITIONS | ADD COPY DELETE EDIT | PRIVATE |

[ OK ]   [ CANCEL ]

*FIG. 5E*

SEARCH MAIN

USER : RESEARCHER 1

SEARCH : 40 YEAR OLDS WITH HEART CONDITIONS

SEARCH CONDITIONS

| ACTION | NOT | CONDITION | COMPONENT |
|---|---|---|---|
| DELETE | ☐ | (AGE > 40) | |
| DELETE AND | ☐ | (AGE < 50) | |
| DELETE AND | ☐ | ((ICD9=410) OR (ICD9=412)) | HEART CONDITIONS |

[ ADD CONDITION ]—504   [ ADD COMPONENT ]—506

OUTPUT

[ CHANGE DATA ]—512   [ CHANGE FORMAT ]—514

SEARCH

[ RUN ]—516  [ SAVE ]—518   [ SAVE AS COMPONENT ]—520

[ SHOW SQL ]—522   [ CANCEL ]—524

SEARCH MAIN
USER : RESEARCHER 1
SEARCH : UNSAVED

SEARCH CONDITIONS

| ACTION | NOT | CONDITION | COMPONENT |
|---|---|---|---|
| DELETE | ☐ | DIAGNOSIS=LIVER DISEASE | |
| DELETE AND | ☐ | ? HL_PARAM_MARKER 1 | 1008 |
| DELETE AND | ☐ | ? HL_PARAM_MARKER 2 | |

[ADD CONDITION] [ADD COMPONENT]—1006  [ADD HIGH LEVEL PARAMETER MARKER]

OUTPUT

[CHANGE DATA]  [CHANGE FORMAT]

SEARCH

[RUN] [SAVE]  [SAVE AS COMPONENT]
[SHOW SQL]  [CANCEL]

SEARCH MAIN
USER : RESEARCHER 1
SEARCH : UNSAVED

ASSOCIATED CONDITIONS

| CONDITION | COMPONENT |
|---|---|
| (AGE ≥ 20) AND (AGE< 30) | AGE = TWENTIES |
| (AGE ≥ 30) AND (AGE< 40) | AGE = THIRTIES |
| (AGE ≥ 40) AND (AGE < 50) | AGE = FORTIES |

[ADD CONDITION]  [ADD COMPONENT]

OUTPUT

[OK]  [CANCEL]  [SAVE]

*FIG. 10B*

| SEARCH RESULTS | | |
|---|---|---|
| SEARCH: LIVER DISEASE 20-40 YR OLD | | |
| HL_PARAMETER 1 (1310) | HL_PARAMETER 2 (1320) | RESULTS (1330) |
| GENDER=FEMALE | AGE=TWENTIES | 4000 |
| GENDER=FEMALE | AGE=THIRTIES | 2500 |
| GENDER=FEMALE | AGE=FORTIES | 1500 |
| GENDER=MALE | AGE=TWENTIES | 9500 |
| GENDER=MALE | AGE=THIRTIES | 4400 |
| GENDER=MALE | AGE=FORTIES | 3000 |

CLOSE

FIG. 13

QUERY ABSTRACTION HIGH LEVEL PARAMETERS FOR REUSE AND TREND ANALYSIS

BACKGROUND OF THE INVENTION

1. Field of the Invention

The present invention generally relates to data processing and more particularly to building database queries with high level parameter markers that can be associated with a set of query conditions.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

Queries are constructed of query conditions that serve to filter results returned from the query. Accordingly, a query may be thought of as group of filters put together to sift out only the data in which they are interested. Often, it may be desirable to modify one or more of the query conditions and re-execute the query to determine the effects of the query condition on the results returned. Some high level query languages provide support for parameter markers which allow SQL statements to be generic and reused, allowing for easy modification.

The concept of parameter markers can be described with reference to the following simple query:

Select*from employee Table where gender='M'

The query returns a list of all male employees listed in a table employee Table. The query may be rewritten as:

Select*from employee Table where gender=?

The question mark replacing the 'M' represents a parameter marker and instructs the database engine that this specific value (for gender) will be provided later. By making this change, this single query can be used for selecting all the male employees or all the female employees, by setting the parameter marker to 'M' or 'F', respectively.

For some applications, such as data mining, trend analysis, and data warehouse exploration, it may be useful to substitute a group of conditions for a parameter marker, rather than just a value. For example, a medical researcher may be interested in the rate of occurrence of a particular disease in different categories of people (e.g., males vs. females, young vs. old, etc). In other words, the researcher may want to generate a query such as:

Select*from patient_table where?

The researcher may want to execute the query by substituting entire query conditions for the parameter marker (e.g., males between 20 and 30, females between 20 and 30, etc.) to gather data for, different groups of data. However, in contrast to the previous example, where a database engine could construct the entire query, absent the value field ('M' or 'F'), in this example, the database engine would not be able to begin to construct the condition. Therefore, parameter markers have limitation on where they may be placed in a query, and the statement above would not be allowable.

In other words, conventional parameter markers may not be used for high level query criteria, such as entire query conditions or sets of query conditions. Therefore, there is a need for an improved method for building queries with high level parameter markers.

SUMMARY OF THE INVENTION

The present invention is generally directed to a method, article of manufacture, and system for generating and executing queries with high level parameter markers having one or more associated query conditions. In contrast to conventional parameter markers that are limited to association with simple values of a query condition, high level parameter markers may be associated with a set of entire query conditions.

The method generally includes building a query with at least one parameter marker embedded therein, associating one or more query condition with the parameter marker. The method further includes programmatically, for each query condition, building a complete query by substituting the query condition for the parameter marker, executing the complete query, receiving results from executing the complete query, and storing the results from executing the complete query.

The article of manufacture generally includes a computer-readable medium containing a program which, when executed by a processor, performs operations for accessing data. The operations generally include receiving a query with one or more parameter markers embedded therein, wherein a set of query conditions are associated with each parameter marker, generating combinations of query conditions, wherein each combination comprises a query condition from each set of query conditions. The operations further include, for each combination of query conditions, building a complete query by substituting the combination of query conditions for the parameter markers, executing the complete query, receiving results from executing the complete query, and storing the results from executing the complete query.

The system generally includes a graphical user interface (GUI), a query building component and a query executing component. The GUI may be configured to receive, from a user, a query including at least one parameter marker and one or more query conditions associated with the parameter markers. The query building component may be configured to build complete queries based on the received query by substituting, for the parameter marker, the one or more query conditions associated with the parameter marker. The query executing component may be configured to execute the complete queries.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 5A–5F are graphical user interface (GUI) screens for building a database query.

FIGS. 10A–10B are graphical user interface (GUI) screens for building a database query with high level parameter markers.

FIG. 13 is an exemplary GUI screen formatted with query results for different combinations of query conditions substituted for high level parameter markers.

DETAILED DESCRIPTION OF THE PREFERRED EMBODIMENTS

The present invention generally is directed to a system, method and article of manufacture for accessing data independent of the particular manner in which the data is physically represented. In one embodiment, a data repository abstraction layer provides a logical view of the underlying data repository that is independent of the particular manner of data representation. A query abstraction layer is also provided and is based on the data repository abstraction layer. A runtime component performs translation of an abstract query into a form that can be used against a particular physical data representation.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Figure 1:
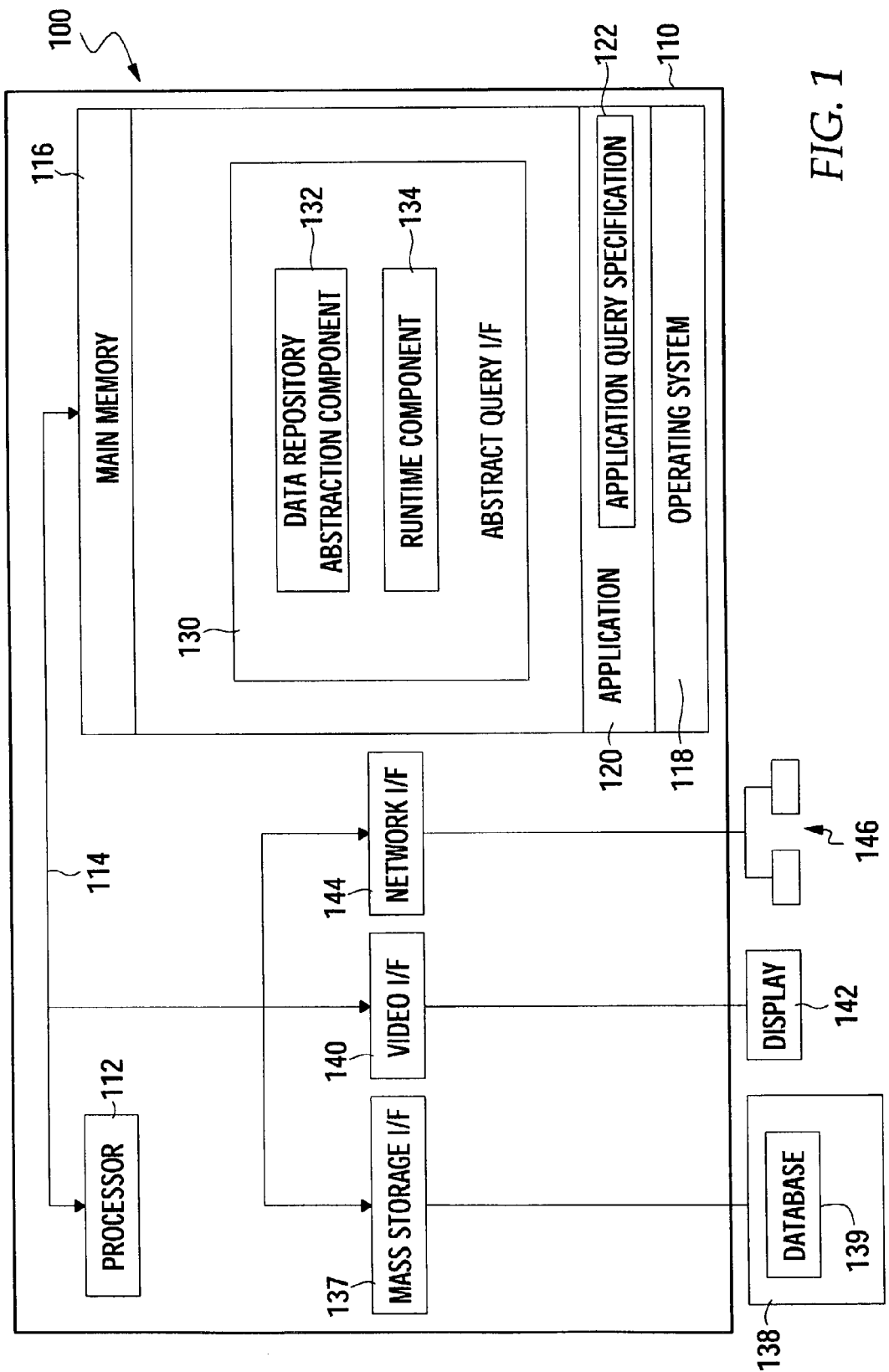
FIG. 1 is a computer system illustratively utilized in accordance with the invention.

Referring now to FIG. 1, a computing environment 100 is shown. In general, the distributed environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 100. Examples of the operating system 118 include IBM OS/400®, UNIX, Microsoft Windows®, and the like.

The memory 116 further includes one or more applications 120 and an abstract query interface 130. The applications 120 and the abstract query interface 130 are software products comprising a plurality of instructions that are resident at various times in various memory and storage devices in the computer system 100. When read and executed by one or more processors 112 in the computer system 100, the applications 120 and the abstract query interface 130 cause the computer system 100 to perform the steps necessary to execute steps or elements embodying the various aspects of the invention. The applications 120 (and more generally, any requesting entity, including the operating system 118) are configured to issue queries against a database 139 (shown in storage 138). The database 139 is representative of any collection of data regardless of the particular physical representation. By way of illustration, the database 139 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") are composed using logical fields defined by the abstract query interface 130. In particular, the logical fields used in the abstract queries are defined by a data repository abstraction component 132 of the abstract query interface 130. The abstract queries are executed by a runtime component 134 which transforms the abstract queries into a form consistent with the physical representation of the data contained in the database 139. The application query specification 122 and the abstract query interface 130 are further described with reference to FIG. 2.

Figure 2A:
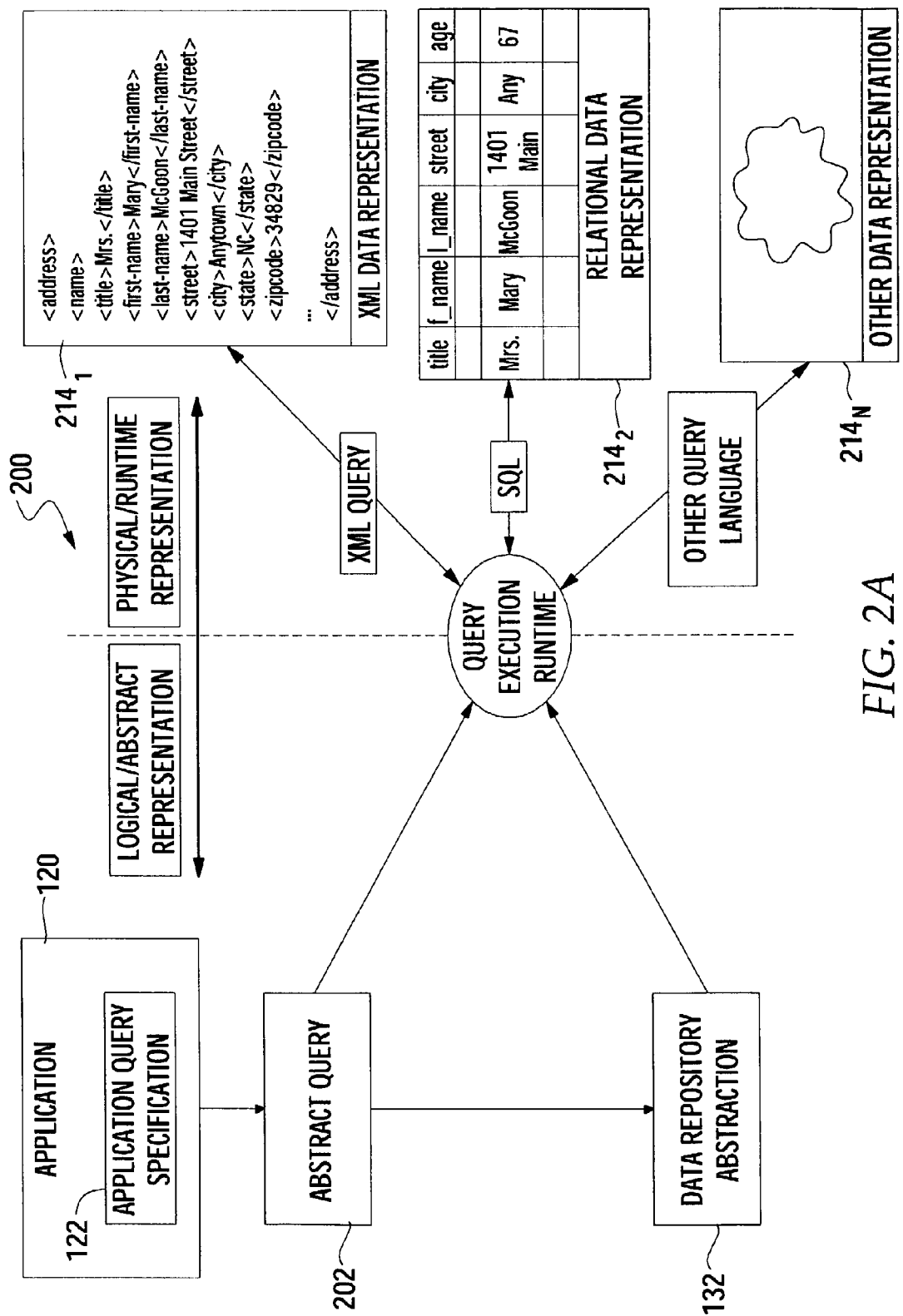
FIG. 2 is a relational view of software components of one embodiment of the invention.
Figure 2B:
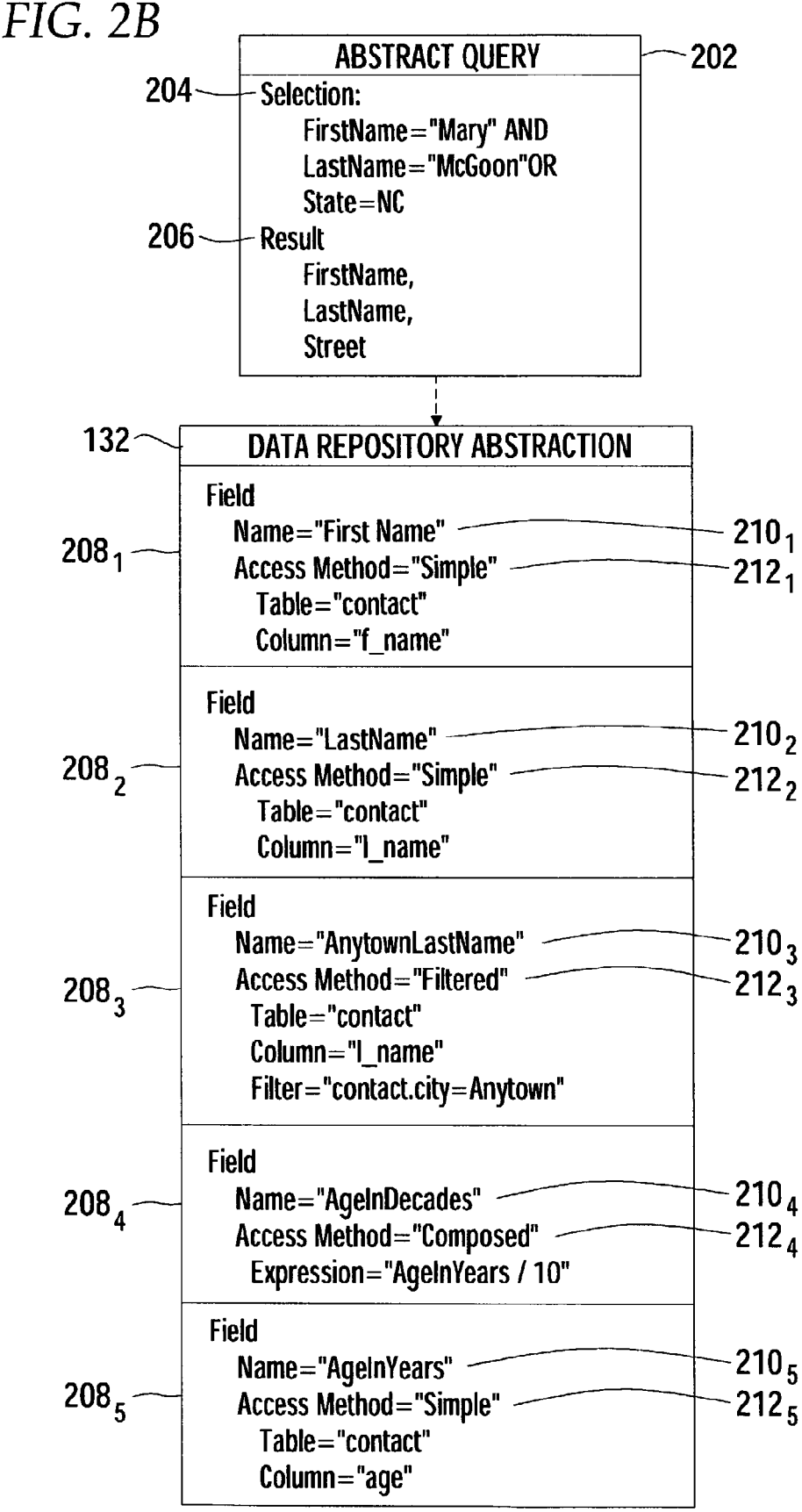

FIGS. 2A–B show an illustrative relational view 200 of components of the invention. The requesting entity (e.g., one of the applications 120) issues a query 202 as defined by the respective application query specification 122 of the requesting entity. The resulting query 202 is generally referred to herein as an "abstract query" because the query is composed according to abstract (i.e., logical) fields rather than by direct reference to the underlying physical data entities in the database 139. As a result, abstract queries may be defined that are independent of the particular underlying data representation used. In one embodiment, the application query specification 122 may include both criteria used for data selection (selection criteria 204) and an explicit specification of the fields to be returned (return data specification 206) based on the selection criteria 204.

The logical fields specified by the application query specification 122 and used to compose the abstract query 202 are defined by the data repository abstraction component 132. In general, the data repository abstraction component 132 exposes information as a set of logical fields that may be used within a query (e.g., the abstract query 202) issued by the application 120 to specify criteria for data selection and specify the form of result data returned from a query operation. The logical fields are defined independently of the underlying data representation being used in the database 139, thereby allowing queries to be formed that are loosely coupled to the underlying data representation.

In general, the data repository abstraction component 132 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification comprises a logical field name $210_1$, $210_2$, $210_3$, $210_4$, $210_5$ (collectively, field name 210) and an associated access method $212_1$, $212_2$, $212_3$, $212_4$, $212_5$ (collectively, access method 212). The access methods associate (i.e., map) the logical field names to a particular physical data representation $214_1$, $214_2$ ... $214_N$ in a database (e.g., database 139). By way of illustration, two data representations are shown, an XML data representation $214_1$ and a relational data representation $214_2$. However, the physical data representation $214_N$ indicates that any other data representation, known or unknown, is contemplated. In one embodiment, a single data repository abstraction component 132 contains field specifications (with associated access methods) for two or more physical data representations 214. In an alternative embodiment, a different single data repository abstraction component 132 is provided for each separate physical data representation 214.

Any number of access methods are contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". The field specification $208_3$ exemplifies a filtered field access method 212$_3$. Filtered fields identify an associated physical entity and provide rules used to define a particular subset of items within the physical data representation. An example is provided in FIG. 2B in which the filtered field access method 212$_3$ maps the logical field name 210$_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification 208$_4$ exemplifies a composed field access method 212$_4$. Composed access methods compute a logical field from one or more physical fields using an expression supplied as part of the access method definition. In this way, information which does not exist in the underlying data representation may be computed. In the example illustrated in FIG. 2B the composed field access method 212$_3$ maps the logical field name 210$_3$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data repository abstraction component 132 shown in FIG. 2 are representative of logical fields mapped to data represented in the relational data representation 214$_2$. However, other instances of the data repository abstraction component 132 map logical fields to other physical data representations, such as XML.

An illustrative abstract query corresponding to the abstract query 202 shown in FIG. 2 is shown in Table I below. By way of illustration, the abstract query 202 is defined using XML. However, any other language may be used to advantage.

TABLE I

QUERY EXAMPLE

| | |
|---|---|
| 001 | <?xml version="1.0"?> |
| 002 | <!--Query string representation: (FirstName = "Mary" AND LastName = |
| 003 | "McGoon") OR State = "NC"--> |
| 004 | <QueryAbstraction> |
| 005 |    <Selection> |
| 006 |       <Condition internalID="4"> |
| 007 |          <Condition field="FirstName" operator="EQ" value="Mary" |
| 008 | internalID="1"/> |
| 009 |          <Condition field="LastName" operator="EQ" value="McGoon" |
| 010 | internalID="3" relOperator="AND"></Condition> |
| 011 |       </Condition> |
| 012 |       <Condition field="State" operator="EQ" value="NC" internalID="2" |
| 013 | relOperator="OR"></Condition> |
| 014 |    </Selection> |
| 015 |    <Results> |
| 016 |       <Field name="FirstName"/> |
| 017 |       <Field name="LastName"/> |
| 018 |       <Field name="State"/> |
| 019 |    </Results> |
| 020 | </QueryAbstraction> |

Illustratively, the abstract query shown in Table I includes a selection specification (lines 005–014) containing selection criteria and a results specification (lines 015–019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative data repository abstraction corresponding to the Data Repository Abstraction 132 shown in FIG. 2 is shown in Table II below. By way of illustration, the Data Repository Abstraction 132 is defined using XML. However, any other language may be used to advantage.

TABLE II

DATA REPOSITORY ABSTRACTION EXAMPLE

```
001  <?xml version="1.0"?>
002  <DataRepository>
003    <Category name="Demographic">
004      <Field queryable="Yes" name="FirstName" displayable="Yes">
005        <AccessMethod>
006          <Simple columnName="f_name" tableName="contact"></Simple>
007        </AccessMethod>
008        <Type baseType="char"></Type>
009      </Field>
010      <Field queryable="Yes" name="LastName" displayable="Yes">
011        <AccessMethod>
012          <Simple columnName="l_name" tableName="contact"></Simple>
013        </AccessMethod>
014        <Type baseType="char"></Type>
015      </Field>
016      <Field queryable="Yes" name="State" displayable="Yes">
017        <AccessMethod>
018          <Simple columnName="state" tableName="contact"></Simple>
019        </AccessMethod>
020        <Type baseType="char"></Type>
021      </Field>
022    </Category>
023  </Data Repository>
```

Figure 3:
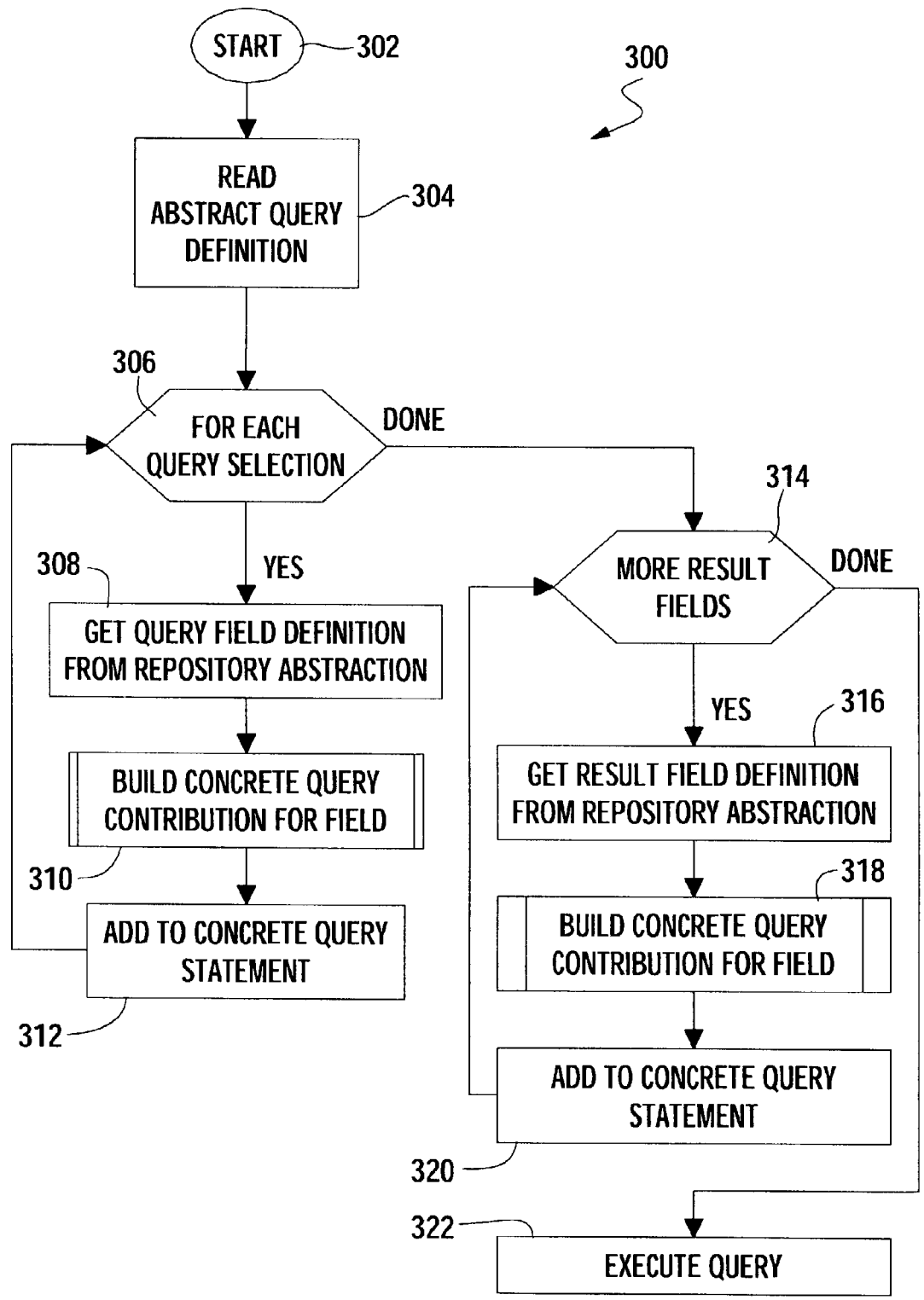
FIG. 3 is a flow chart illustrating the operation of a runtime component.

FIG. 3 shows an illustrative runtime method 300 exemplifying one embodiment of the operation of the runtime component 134. The method 300 is entered at step 302 when the runtime component 134 receives as input an instance of an abstract query (such as the abstract query 202 shown in FIG. 2). At step 304, the runtime component 134 reads and parses the instance of the abstract query and locates individual selection criteria and desired result fields. At step 306, the runtime component 134 enters a loop (comprising steps 306, 308, 310 and 312) for processing each query selection criteria statement present in the abstract query, thereby building a data election portion of a Concrete Query. In one embodiment, a selection criterion consists of a field name (for a logical field), a comparison operator (=, >, <, etc) and a value expression (what is the field being compared to). At step 308, the runtime component 134 uses the field name from a selection criterion of the abstract query to look up the definition of the field in the data repository abstraction 132. As noted above, the field definition includes a definition of the access method used to access the physical data associated with the field. The runtime component 134 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 134 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 134 looks up a result field name (from the result specification of the abstract query) in the data repository abstraction 132 and then retrieves a Result Field Definition from the data repository abstraction 132 to identify the physical location of data to be returned for the current logical result field. The runtime component 134 then builds (as step 318) a Concrete Query Contribution (of the concrete query that identifies physical location of data to be returned) for the logical result field. At step 320, Concrete Query Contribution is then added to the Concrete Query Statement. Once each of the result specifications in the abstract query has been processed, the query is executed at step 322.

Figure 4:
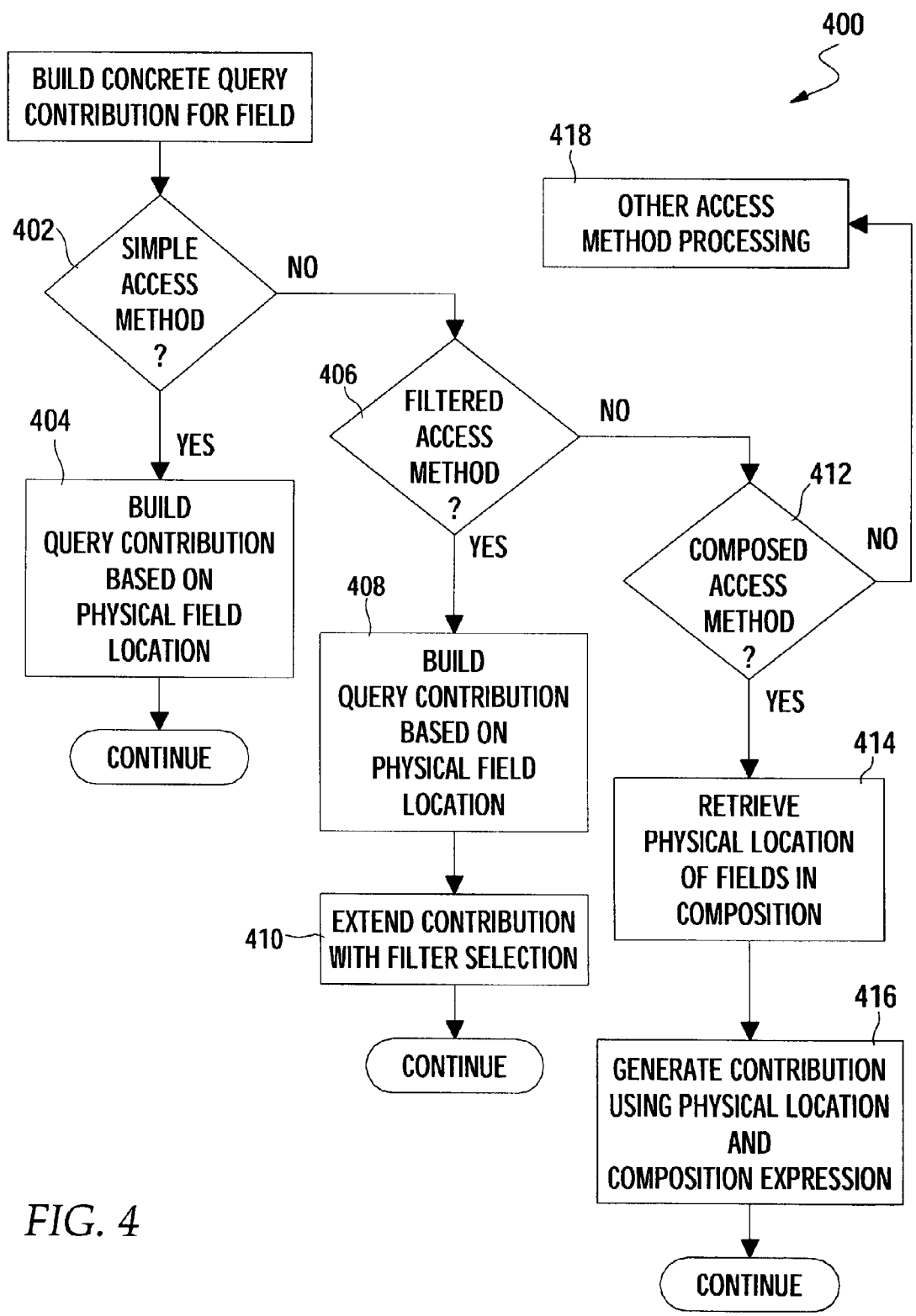
FIG. 4 is a flow chart illustrating the operation of a runtime component.

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less than all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

In various embodiments, the invention provides numerous advantages over the prior art. In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case with a given physical data representation is modified or restructured, the corresponding data repository abstraction is updated to reflect changes made to the underlying physical data model. The same set of logical fields are available for use by queries, and have merely been bound to different entities or locations in physical data model. As a result, requesting entities written to the abstract query interface continue to function unchanged, even though the corresponding physical data model has undergone significant change. In the event a requesting entity is to be used with a completely new physical data representation than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

In another aspect, the invention facilitates ease-of-use for the application builder and the end-user. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

AN EXEMPLARY QUERY BUILDING GRAPHICAL USER INTERFACE

According to some aspects of the present invention, a graphical user interface (GUI) may provide the end user a convenient means for building a query. The GUI may allow the end user to build complex queries while hiding the underlying details of database operations. Thus, the GUI may allow an end user to concentrate more on building queries to return desired data and less on detailed rules of a query language. The GUI may accomplish this by providing an end user one or more screens for adding query conditions. The GUI may also provide a convenient means for associating query conditions with reusable query components, which may further facilitate building queries through the reuse of common query conditions.

FIGS. 5A–F illustrate exemplary screens of a GUI for building a database query. Of course, the GUI screens of FIGS. 5A–F illustrate only one embodiment of the present invention, and many different variations of suitable GUI screens may allow a user to build a query within the scope of the present invention. For illustrative purposes only, the FIGS. 5A–G will be described with reference to building queries to a database containing fields related to the medical industry. Specifically, the FIGS. 5A–G will be described with reference to an example for building a query for generating a list of patients between the ages of 40 and 50 with heart conditions. Of course, similar GUI screens may be created for building queries to databases containing fields related to any industry.

FIG. 5A illustrates a main search GUI screen 500 of the query building GUI. The main search screen may include a QUERY CONDITIONS window 502 to display a list of current query conditions. The current query conditions may be shown as abstract query conditions in common language terms. As illustrated, the query being built currently has previously added age-related query conditions for "Age>40" and "Age>50." For some embodiments, logical operators relating the current query conditions (e.g., AND, OR, AND NOT, etc.) may be modified directly from the QUERY CONDITIONS window 502, for example, via a pull down menu. Alternatively, logical operators may be specified when adding a new query condition. The current (age related) query conditions may have been added via another GUI screen for adding query conditions to the query, which may be accessed via an ADD CONDITION button 504.

For example, FIG. 5B illustrates a GUI screen 530 for adding query conditions to the query. As illustrated, the GUI screen 530 may present a list of categories to the end user. The list of categories may depend on an industry for which the database is established. For example, for a medical industry database application, the list of categories may include a DEMOGRAPHIC category 532, a LABARATORY RESULT category 534, a REPORTS category 536, conditions for the individual codes (e.g, via the GUI screen of FIG. 5B), as if building a new query. FIG. 5C, illustrates a main search screen listing the individual query conditions "ICD-9=410" OR "ICD-9=412." An abstract query using these current query conditions may be represented in XML as:

TABLE III

ABSTRACT QUERY EXAMPLE

```
001   <?xml version="1.0"?>
002   <!--Query string representation: (ICD-9 = "410" OR ICD-9 =
003   "412")-->
004   <QueryAbstraction>
005       <Selection>
006           <Condition field="ICD-9" operator="EQ" value="410">
007               <Condition relOperator = "OR" field="ICD-9" operator="EQ" value="412">
008           </Condition>
009       </Selection>
010       <Results>
011                   <Field name="ICD-9"/>
012       </Results>
013   </QueryAbstraction>
``` and a DIAGNOSTIC CODE category 538 (as illustrated, the DIAGNOSTIC CODE category 538 may allow a user to enter government mandated ICD-9 diagnostic codes). Each of the categories may have a list of related subcategories.

For example, the DEMOGRAPHIC category 532 may include subcategories for Birth and Age Related data, Name, and Address. To enter a query condition related to one of the fields, the end user may select one of the subcategories. In response to selecting one of the subcategories, the user may be presented with another GUI screen allowing for specifying the query condition. For example, one such GUI screen may allow the user to enter the age related conditions listed in FIG. 5A by entering the number of years. Age is typically not stored in a database, but rather calculated from a birth date and current date. However, the GUI may hide this detail from a user, greatly facilitating the entry of age related conditions.

REUSABLR QUERY COMPONENTS

As previously described, multiple queries may share common query conditions. Therefore, embodiments of the present invention allow one or more query condition to be associated with a reusable query component. When building a new query, a reusable query component may be added as a convenient way to add all the associated query conditions to the new query. The number of query conditions associated with a reusable query component may range from one to many. Accordingly, relatively complex queries having a large number of query conditions may be built by adding a relatively small number of reusable query conditions.

As an example of common query conditions, multiple queries issued against a medical database may include query conditions to limit the results to patients with heart conditions. Therefore, a reusable query component may contain query conditions for ICD-9 diagnostic codes associated with heart conditions. For illustrative purposes, the diagnostic codes associated with heart conditions are assumed to be codes 410 and 412. However, the actual diagnostic codes associated with heart disease may be different and may be updated periodically.

To generate the reusable query component for heart condition diagnostic codes, a user may first add query Where, the abstract query shown in Table III includes a selection specification (lines 005–009) containing selection criteria (i.e., the age related search conditions) and a results specification (lines 010–012). As illustrated, the relatively simple query in abstract terms ("ICD-9=410" OR "ICD-9=412") may result in a relatively complex abstract code. Therefore, adding these query conditions to a query may not be trivial.

However, according to aspects of the present invention, the user may be able to save the current query conditions as a reusable query component. For example, the user may access another GUI screen, such the GUI screen illustrated in FIG. 5D, for saving the current query conditions as a reusable query component via a SAVE AS COMPONENT button 520. As illustrated, the GUI screen of FIG. 5D may include a NAME edit box 550 allowing a user to enter a name for the reusable query component. For example, the reusable query component may be given a common language descriptive name (e.g., "Heart Conditions") making it possible to identify them without analyzing the actual query conditions contained therein. Further, a DESCRIPTION edit box 554 may allow the user to enter further identifying details. The query conditions, name, and description for each reusable query component may be stored in a database for later retrieval and use.

As illustrated, the user may also be able to specify whether the reusable query component is made available to other users (i.e., public), for example, via a MAKE PUBLIC checkbox 556. Thus, making the reusable query component public may result in even greater reuse of common query conditions. Alternatively, for security reasons, a user may choose not to make a reusable query component public. Further, for some embodiments, different levels of access may be assigned to a reusable query component, allowing only certain users (e.g., with certain privilege levels) access the reusable query component.

When the reusable query component is saved only the query conditions, rather than the entire query may be saved. In other words, as illustrated in TABLE IV, the conditions from the SELECTION section only from the abstract query illustrated in TABLE III may be saved:

TABLE IV

REUSABLE QUERY COMPONENT EXAMPLE

001  <Condition field="ICD-9" operator="EQ" value="410">
002      <Condition relOperator = "OR" field="ICD-9" operator="EQ" value="412">
003  </Condition>

By saving only the query conditions, reusable query components may be more storage efficient than scripts that store an entire query. As previously described, while the illustrated example may have only two conditions, other reusable query components may be generated with many more conditions. Accordingly, reusable query components may greatly facilitate building complex queries with multiple conditions. Once saved, the conditions of the reusable query component may be added to a query by adding the component.

For example, referring back to FIG. 5A, to add the heart conditions query conditions ("ICD-9=410" OR "ICD-9=412") to the age query conditions ("AGE>40" AND "AGE<50"), the user may add the reusable query component for heart conditions. To add the reusable query component for heart conditions, the user may access another GUI screen, such as the GUI screen 560 illustrated in FIG. 5E, via an ADD COMPONENTS button 506. As illustrated, the GUI screen 560 may display a list of available reusable query components by name, along with associated descriptions. For example, the GUI screen 560 illustrates another reusable query component ("CNS Diseases") that includes query conditions for diagnostic codes for central nervous system (CNS) diseases. As illustrated, the GUI screen 560 may allow the user to add, copy, delete, or edit the listed reusable query components. To add the reusable query component for heart conditions, the user may simply press the corresponding ADD button. As a number of reusable query components grows, the GUI screen 560 may also include means for searching the reusable query components (e.g., via names, key words in the descriptions, or even key words in the associated conditions).

FIG. 5F illustrates the final query (for searching patients between the ages of 40 and 50 that have been diagnosed with heart disease) after adding the reusable query component for heart conditions. As illustrated, the individual query conditions listed in the QUERY CONDITIONS window 502 may include the query conditions associated with the HEART CONDITIONS reusable query component. The reusable query component name may also be listed adjacent the individual query conditions to indicate their association with a reusable query component. Thus, reusable query components provide a convenient means for adding one or more query conditions to a query, without having to redefine individual query conditions, or search and edit query scripts. As will be described in greater detail below, in some instances, rather than storing the individual query conditions of a reusable query component with a query, a reference, or link to the reusable query component may be stored, allowing for changes in the underlying conditions to be reflected in the final query at run time.

The GUI screen 500 may also allow a user to change data or format of the output results from the query, via buttons 512 and 514. From the buttons 512 and 514, the user may access other GUI screens that allow the user to choose what data is returned and format an output display list. For example, the user may specify that results displayed sorted on a specified column (e.g., in ascending or descending order). Within an organization, it may be common (or required) to present results in a specified format. For example, in a healthcare organization, results may be listed by patient last name (or date of treatment, age, etc.) in ascending or descending order. In other words, query conditions affecting the output of the results may also be commonly reused for multiple queries. Accordingly, reusable query components may also include formatting conditions which may provide a convenient mechanism for setting the display output for a query.

The GUI screen 500 may also allow a user to view a representation of the query according to a particular data representation. For example, the user may view a screen displaying the query in SQL format by pressing a SHOW SQL button 522, which may cause a runtime component of an application to build a valid SQL query to issue against a database. For other embodiments, a similar function may display the query as an abstract query, for example, in XML. The GUI screen may also include a RUN button 516 allowing a user to build a query based on the list of current conditions and reusable query components, and execute the query against a database.

Figure 6:
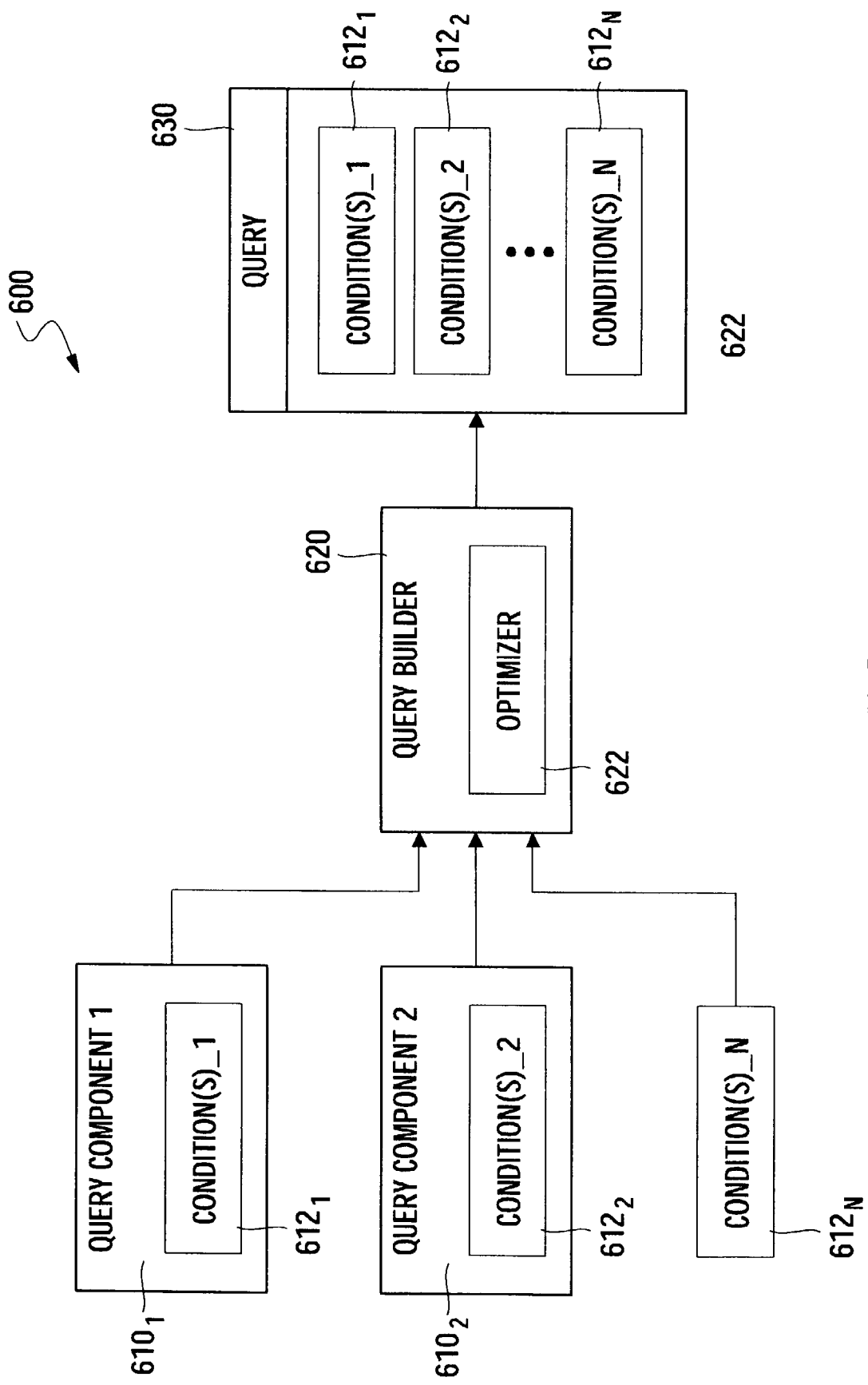
FIG. 6 is a relational view of a query and reusable query components used to build the database query.

FIG. 6 is a relational view of software components of one embodiment of the invention that may be used to build a query from the list of reusable query components and conditions. As illustrated, a query builder 620 may build a query 630 from a conditions $612_1$ and $612_2$ from reusable query components $610_1$ and $610_2$, respectively, and conditions $612_N$, which may or may not be associated with a reusable query component. (Reusable query components $610_1$ and $610_2$ and conditions $612_1$, $612_2$, and $612_N$ may be collectively referred to as components 610 and conditions 612, respectively.) For different queries, the number of components 610 may vary and may include all the conditions 612 for the query 630 (i.e., there may be no independent conditions $612_N$). The query builder 620 may perform any suitable algorithms for building the query 630 from the components 610 and conditions $612_N$. Further, the query builder 620 may include an optimizer 622, for example, to perform optimizations, such as deleting redundant conditions from the conditions 612. For some embodiments, the query builder 620 may be configured to build queries of a particular underlying data representation (e.g., XML, SQL, etc.).

Figure 7:
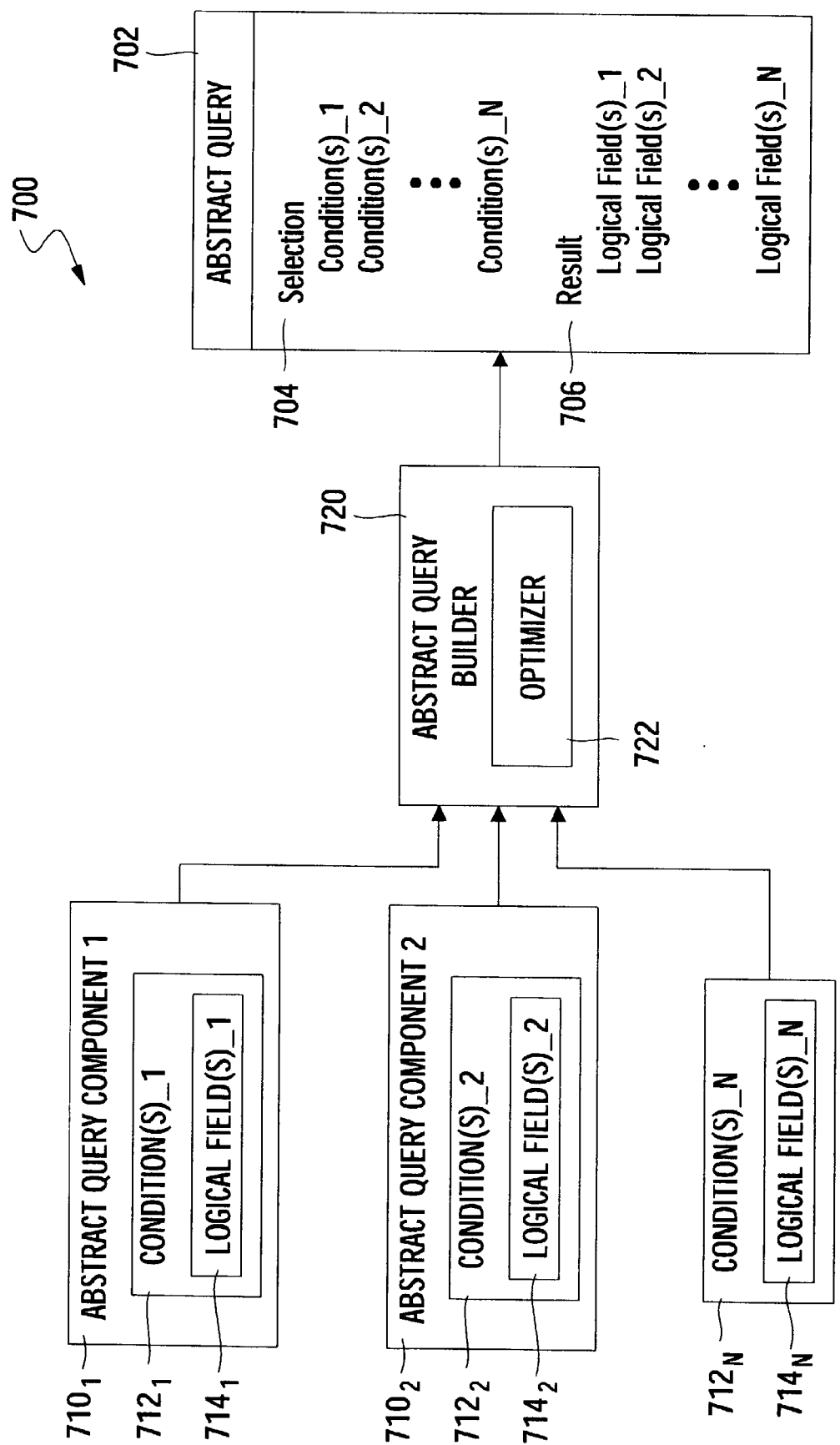
FIG. 7 is a relational view of an abstract query and reusable abstract query components used to build the abstract query.

Alternatively, as illustrated in FIG. 7, an abstract query builder 720 may be configured to build an abstract query 702 from abstract conditions $712_1$ and $712_2$ associated with reusable abstract query components $710_1$ and $710_2$, as well as abstract conditions $712_N$. As illustrated, the abstract conditions $712_1$, $712_2$, and $712_N$ may include logical fields $714_1$, $714_2$, and $714_N$, respectively. As previously described with reference to the abstract query 202 of FIG. 2B, the abstract query 702 is generally referred to herein as an "abstract query" because the query is composed according to abstract logical fields 714, rather than by direct reference to underlying physical data entities in a database. As illustrated, the abstract query 702 may include both criteria used for data selection 704 and an explicit specification of the fields to be returned 706 based on the selection criteria 704. For some embodiments, the abstract query builder 720 may be a software component of the application 120 illustrated in FIG. 2A.

LINKED QUERY COMPONENTS

According to some aspects of the present invention, reusable query components may be generated from one or more other reusable query components (i.e., the other reusable query components may be referred to as subcomponents with respect to the generated reusable query component). For example, referring back to FIG. 5F, the list of current query conditions 502 includes individual query conditions ("AGE>40" AND "AGE<50"), as well as query conditions associated with a reusable query component (HEART CONDITIONS). These current query conditions could be saved as a component, resulting in a reusable query component with the HEART CONDITIONS component as a subcomponent.

This new reusable query component may be generated with either a dynamic link to the subcomponent HEART CONDITONS or by directly adding the conditions of the subcomponent HEART CONDITIONS to the new component when generating the new reusable query component. If the new component is generated with a dynamic link to the subcomponents, the query conditions of the subcomponents will not be directly added to the new reusable query component. Rather, when a query is built using the reusable query component, the query will be built using current conditions of the underlying subcomponent retrieved, via the dynamic link, at runtime.

In other words, if a user wanted to ensure that the new component was updated if there were ever changes to the underlying subcomponent HEART CONDITIONS, a dynamic link may be preferable. For example, conditions of the subcomponent HEART CONDITIONS may be expanded to include new diagnostic codes for heart conditions. A dynamic link to the subcomponent may ensure new queries include these new diagnostic codes. Dynamically linking subcomponents may also facilitate maintenance of reusable query components. For example, if an error exists in a subcomponent, the error only needs to be fixed in the subcomponent to fix the error in components dynamically linked to the subcomponent.

On the other hand, if a user wanted the new reusable query component to represent conditions of a subcomponent at the time of generation, they may choose to add the conditions directly (i.e., a static link). If static links are used, a new component is the complete body of the two subcomponents so that it is not associated with the subcomponent anymore. For different embodiments, whether or not to use dynamic links when generating reusable query components from subcomponents may be specified for each subcomponent.

Figure 8:
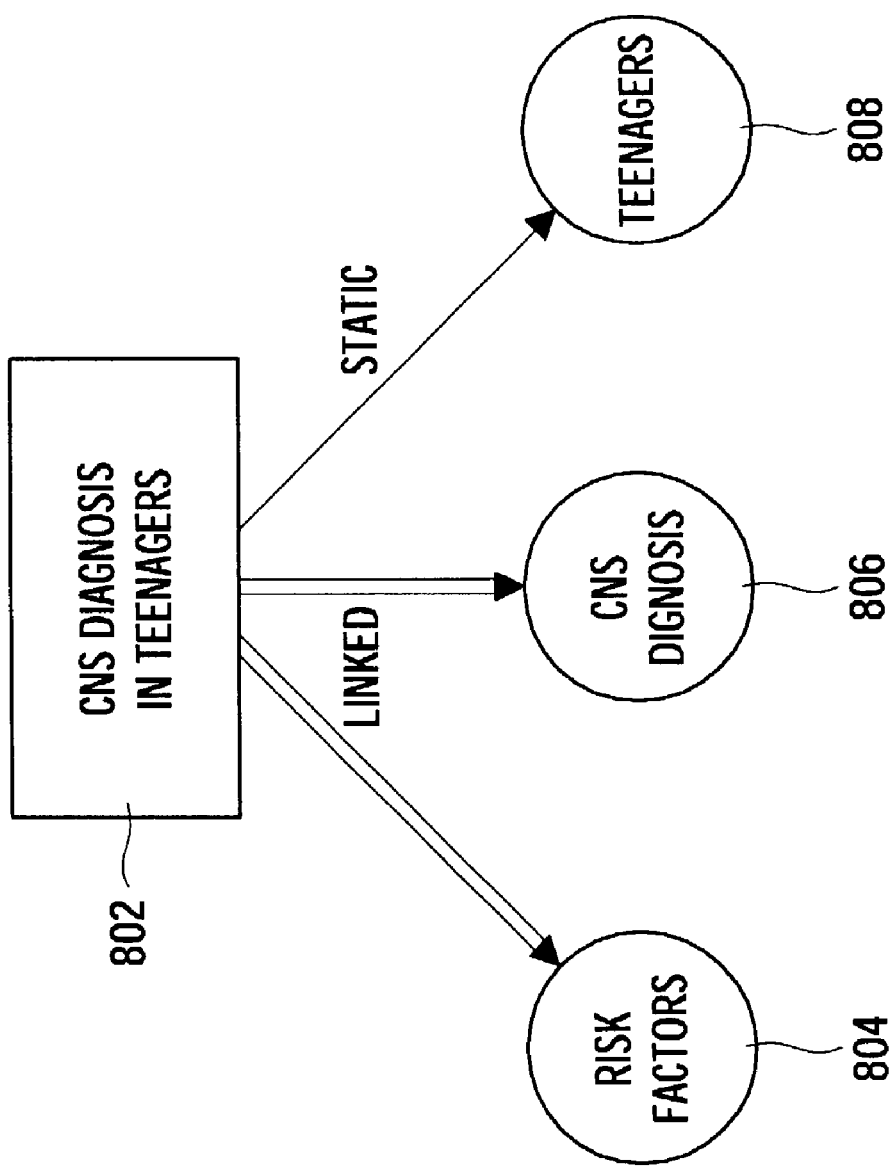
FIG. 8 is a relational view of a reusable query component to linked and unlinked subcomponents.

FIG. 8 illustrates a reusable query component with a combination of dynamic and static links to subcomponents. As illustrated, a reusable query component 802 may be generated to limit query results to teenagers diagnosed with central nervous system (CNS) diseases. Subcomponents 804 and 806 may include query conditions related to risk factors and CNS diagnosis codes, respectively, while subcomponent 808 may include query conditions to limit the query results to teenagers. Because risk factors and CNS diagnosis codes may be updated periodically, the subcomponents 804 and 806 may be dynamically linked to the component 802 (as indicated by the double lines) to ensure that any query built from the component 802 will be executed using search conditions reflecting the latest risk factors and CNS diagnostic codes. On the other hand, the definition of teenagers is not likely to change, so the subcomponent 808 may be statically linked to the component 802 (as indicated by the single line). Therefore, the conditions of the subcomponent 808 may be directly copied into the component 802.

BUILDING QUERIES WITH HIGH LEVEL PARAMETER MARKERS

According to some aspects of the present invention, one or more reusable query components and/or query conditions may be associated with high level parameter markers to facilitate data gathering. As previously described, conventional parameter markers are limited in where they may be placed within a query, and are generally limited to representing a simple value to be supplied at execution time. However, high level parameter markers of the present invention are not so limited, and may be used to represent an entire query condition or set of query conditions to be supplied at execution time. A user may build a query condition with one or more high level parameter markers and associate a batch of query conditions with each of the high level parameter markers. At execution time, complete queries may be automatically generated by substituting the associated query conditions for the high level parameter markers, and executed against a data source, which may greatly facilitate the data gathering process.

Hereinafter, a query with one or more high level parameter markers may be referred to as a parameterized query. A number of complete queries may be generated from a single parameterized query by iteratively substituting associated query conditions for each high level parameter marker in the parameterized query. In other words, the number of complete queries generated may depend on both the number of high level parameters included in the parameterized query as well as the number of query conditions associated with each high level parameter marker. Further, the parameterized query and the complete queries may be abstract queries, as described above, including abstract conditions defined by one or more logical fields that may be mapped to physical entities of a data source.

The utility of high level parameter markers may be described with reference to a simple exemplary database application for gathering data on patients with liver disease. To gather data on patients with liver disease, a researcher may generate a conventional query illustrated in Table V:

TABLE V

| CONVENTIONAL QUERY EXAMPLE |
|---|
| 001 Select * from patient_table where |
| 002 (patient diagnosed with liver disease) AND |
| 003 (patient is female) AND |
| 004 (patient is in twenties) |

As illustrated, the query will return information for female patients with liver disease that are in their twenties. However, the researcher may also want to gather data for male patients, as well as patients in other age groups (e.g., patients in their thirties and forties) for comparison. Rather than manually generating and executing individual queries, the researcher may build the parameterized query illustrated in Table VI:

TABLE VI

PARAMETERIZED QUERY EXAMPLE

| | |
|---|---|
| 001 | Select * from patient_table where |
| 002 | (patient diagnosed with liver disease) AND |
| 003 | <high_level_parameter_1> AND |
| 004 | <high_level_parameter_2> |

As illustrated, the gender and age related query conditions of lines 003 and 004 of Table V have been replaced with high level query parameters. Now, to gather data on patients of different genders and different age ranges, diagnosed with liver disease, the researcher may associate gender and age related query conditions with the high level parameters in the query. Of course, while two high level parameters are illustrated in this example, a parameterized query may contain any number of high level parameter markers.

Figure 9:
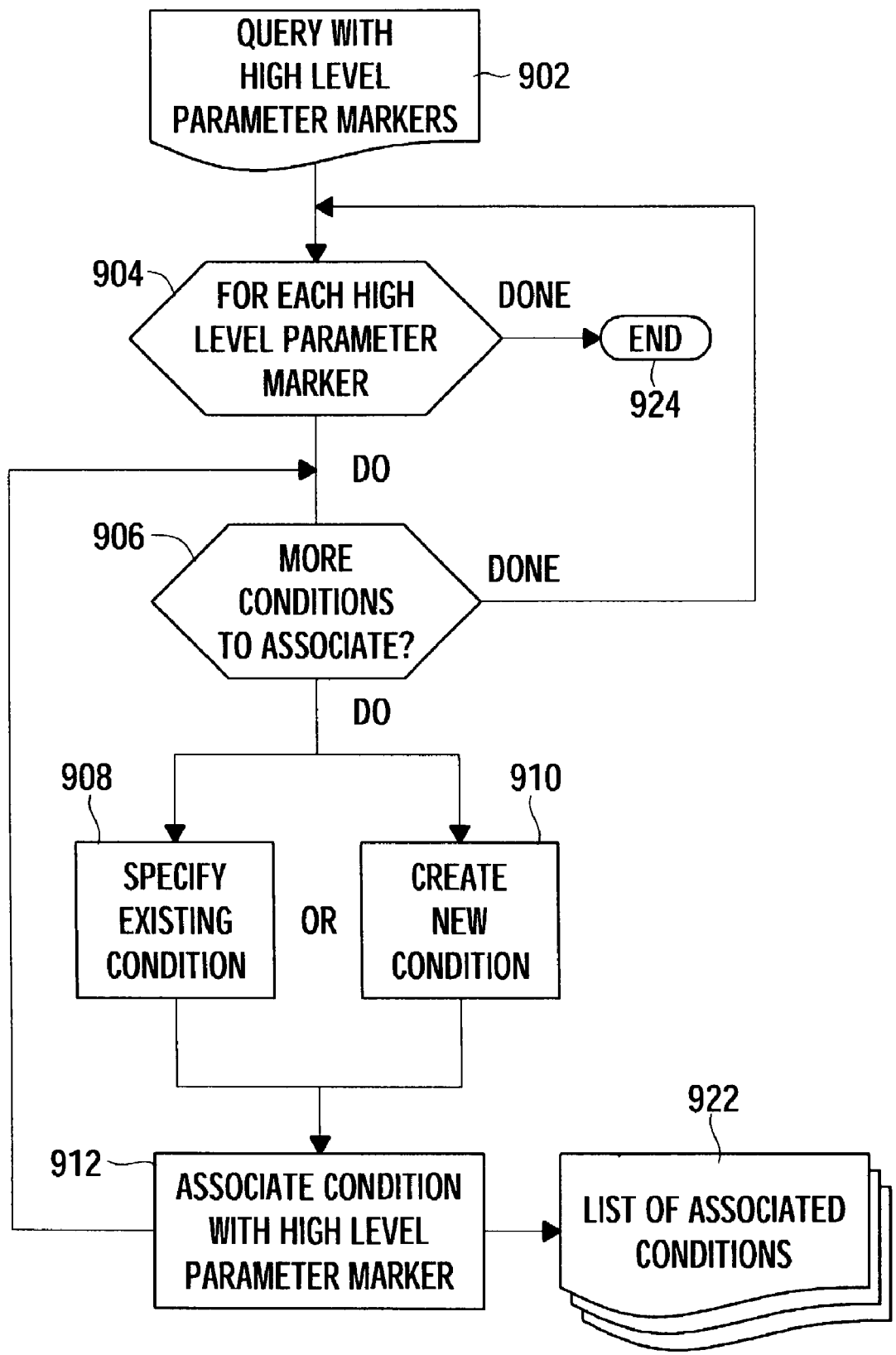
FIG. 9 is a flow chart illustrating operations for associating a set of query conditions with a high level parameter marker.

FIG. 9 is a flow chart illustrating operations 900 for associating a set of query conditions with high level parameter markers of a parameterized query 902. For illustrative purposes, the parameterized query 902 is assumed to be the parameterized query illustrated in Table VI above. The parameterized query 902 may be generated by an application, such as the application 120 of FIG. 1.

The operations begin at step 904, by entering a loop (an outer loop) in which operations are performed for each high level parameter marker in the parameterized query 902. At step 906, another loop (an inner loop) is entered in which operations are performed for each query condition to be associated with the high level parameter markers in the parameterized query 902. For example, the operations of the inner loop may be performed to associate both male and female gender conditions with high_level_parameter_1 and to associate one or more age related conditions with high_level_parameter_2.

If the query condition to be associated with the high level parameter exists, the existing query condition may be specified at step 908. Otherwise, a new query condition may be created at step 910. At step 912, the query condition specified at step 908 or created at step 910 is associated with the high level parameter marker at step 912. Associating the query condition with the high level parameter may include storing the query condition in a list of associated query conditions 922.

Processing returns to step 906 to repeat the inner loop for the next query condition to be associated with the high level parameter marker. The inner loop is repeated for each query condition, after which processing returns to step 904 to repeat the operations of the outer loop for the next high level parameter marker. After the outer loop is repeated for each high level parameter marker, the operations 900 end at step 924, at which time there may be a list of associated query conditions 922 for each high level parameter marker in the parameterized query 902.

For some embodiments, one or more GUI screens may be provided for building the parameterized query 902, as well as for associating query conditions with high level parameter markers included in the parameterized query 902. For example, FIG. 10A illustrates an exemplary GUI screen 1000 for building a parameterized query. The screen 1000 is similar to the screen 500 described above for building a query from individual query conditions and components. The screen 1000 includes a SEARCH CONDITIONS window 1002 with a list of current search conditions which, as illustrated, may include high level parameter markers. High level parameter markers may be added in a similar manner to that described above with reference to adding conditions and reusable query components to a query. For example, in addition to an ADD CONDITION button 1004 and an ADD COMPONENT button 1006, the screen 1000 may also include an ADD HIGH LEVEL PARAMETER button 1008.

In response to pressing the button 1008, a user may be presented with a GUI screen, such as the GUI screen 1020 illustrated in FIG. 10B, for associating query conditions with a high level parameter marker. As illustrated, the GUI screen 1020 may include a list of associated conditions 1022. Individual conditions, as well as reusable query components, may be associated with the high level parameter marker in a manner similar to that described above for to adding query conditions and components when building a new query. As previously described, an advantage to reusable query components is that a number of complex query conditions may be easily added with a single reusable query component.

Further, in a similar manner to that previously described with reference to generating reusable query components from subcomponents, the reusable query components may be statically or dynamically linked to high level parameter markers. In other words, if a query component is statically linked with a high level parameter marker, the underlying query conditions associated with the query component may be directly added to the list of associated query conditions. Alternatively, if the query component is dynamically linked with the high level parameter marker, a link to the query component may be added to the list of associated query conditions. At run time, the underlying query conditions associated with the linked query components may be accessed, ensuring complete queries built from the query component include up-to-date query conditions.

For some embodiments, high level parameter markers, and lists of associated conditions may be saved for later reuse. For example, in the medical industry it may be common to compare results of data gathered for patients of different genders, age groups, zip codes, clinic numbers, diagnoses, etc. In an office application, it may be common to compare results of data gathered for employees in different departments, different facilities, different salary levels, etc. Saving parameter markers and associated conditions may allow a batch of query conditions defining different groups to be defined up front, and reused in many applications.

Further, for some embodiments, high level parameter markers may be associated with a specific category of parameters (such as the categories 532–538 illustrated in FIG. 5B). The conditions that may be associated with such high level parameter markers may be limited to the conditions based on fields related to the specific category. For example, query conditions associated with DEMOGRAPHICS high level parameter markers may be limited to association with demographic based search conditions, such as query conditions related to age, gender, and address.

An advantage to associating high level parameter markers with a specific category may be that only search conditions related to the specific category may be presented to a user associating conditions with the high level parameter markers. Limiting the types of query conditions that may be associated with a high level parameter marker may facilitate generating meaningful queries. Further, a query building engine may be able perform validations to ensure proper types of query conditions are associated with a high level parameter marker, which may provide a level of error checking and reduce a number of inadvertent errors in query building.

EXECUTING QUERIES WITH HIGH LEVEL PARAMETER MARKERS

Figure 11:
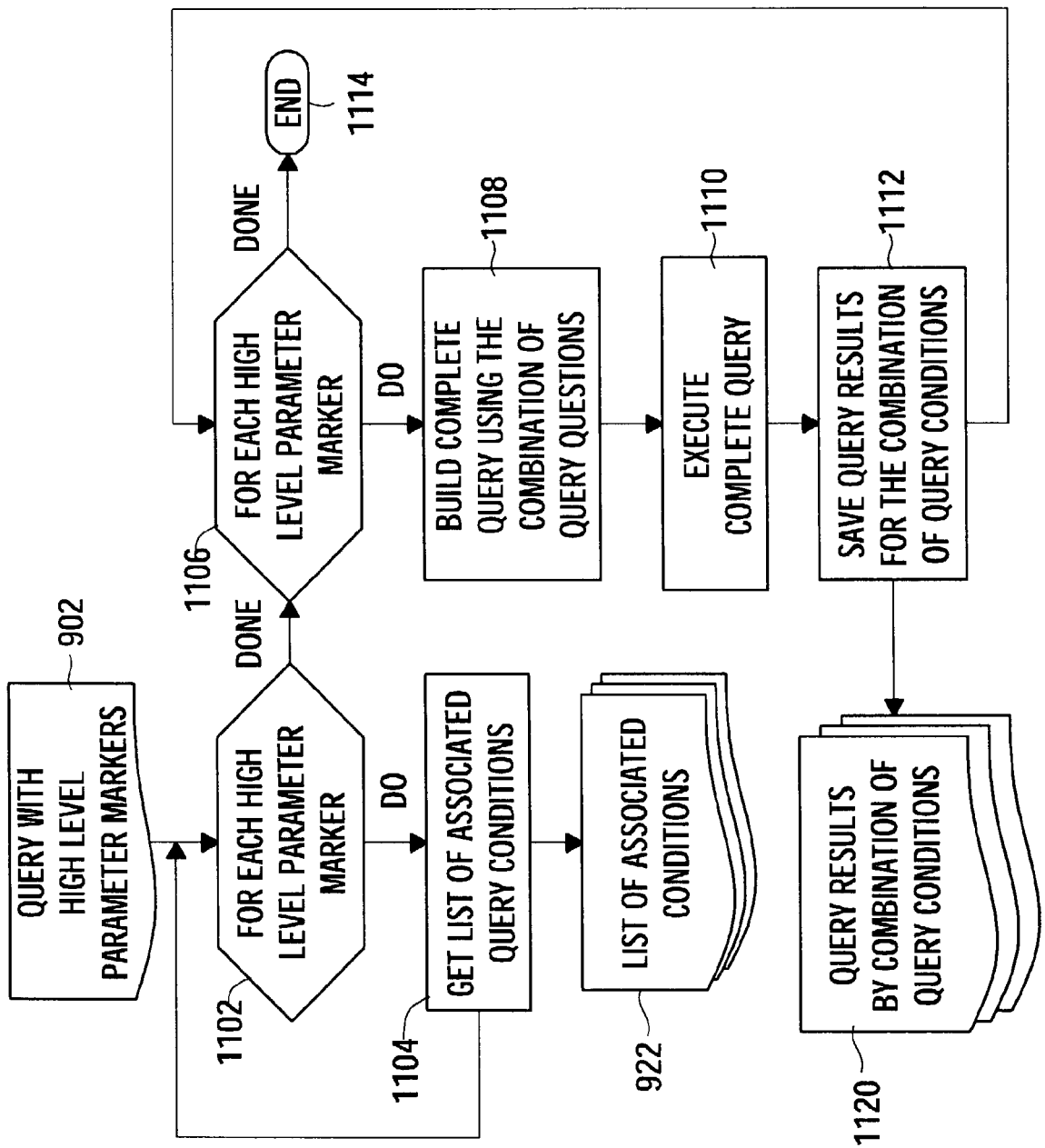
FIG. 11 is a flow chart illustrating operations for executing a database query with high level parameter markers associated with a set of query conditions.

Once query conditions are associated with each high level parameter marker, the parameterized query may be executed against a data source. FIG. 11 is a flow chart illustrating operations 1100 for executing a parameterized query. As illustrated, the operations 1100 may be performed to execute the parameterized query 902 of FIG. 9, for example, after the operations 900 have been performed to associate query conditions with high level parameter markers of the parameterized query 902.

The operations 1100 begin at step 1102, by entering a loop in which a list of associated query conditions are obtained at step 1104 for each high level parameter marker. For example, the lists of high level parameter markers 922 generated by the operations 900 for each high level parameter marker may be accessed to generate a set of possible combinations of query conditions for use in generating complete queries from the parameterized query 902.

Once the list of associated query conditions has been obtained for each high level query parameter, processing proceeds to step 1106, where a loop is entered in which operations are performed for each combination of query conditions that may be substituted for the high level parameter markers in the parameterized query 902. At step 1108, a complete query is built using one of the combination of query conditions. For some embodiments, a software component may be configured to build the complete queries.

Figure 12:
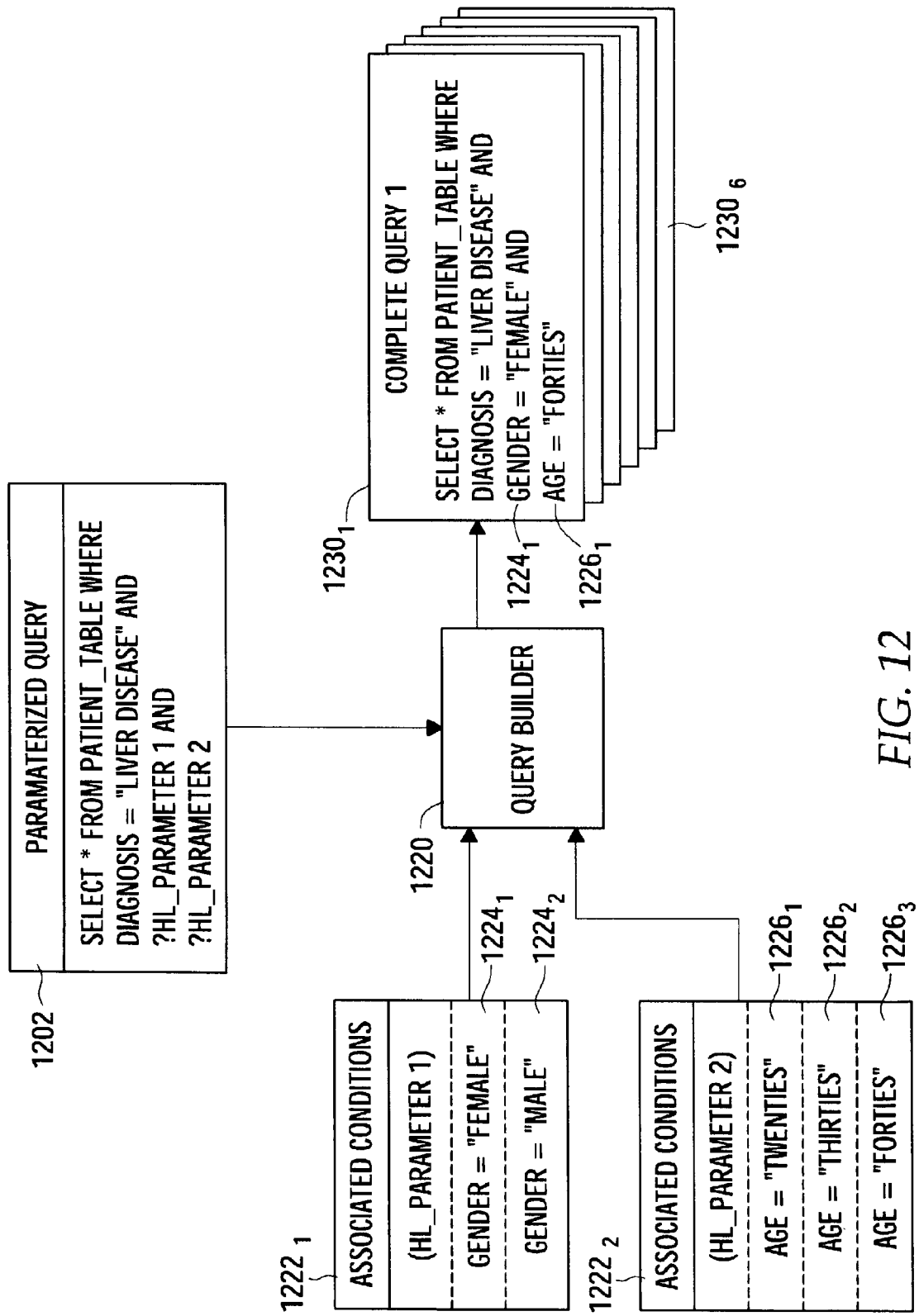
FIG. 12 is a relational view of a component for building complete queries from a query with high level parameter markers and lists of associated query conditions.

For example, FIG. 12 is a relational view of a query building component 1220 for building complete queries $1230_1$–$1230_6$ from a parameterized query 1202 and lists of associated query conditions $1222_1$ and $1222_2$. As illustrated, the parameterized query 1202 has two high level parameter markers 1204 and 1206, with two query conditions $1224_1$ and $1224_2$ associated with the parameter marker 1204 and three query components $1226_1$, $1226_2$, and $1226_3$ associated with the high level parameter marker 1206. Accordingly, in this example, the query builder 1220 may generate 6 complete queries $1230_1$–$1230_6$ corresponding to the 6 possible combinations of query conditions/components from which to build complete queries: $1224_1$/$1226_1$ (females in their twenties), $1224_1$/$1226_2$ (females in their thirties), . . . $1224_2$/$1226_3$ (males in their forties). Of course a number of high level parameter markers, associated query conditions and possible combination of query conditions, may vary with different applications.

Referring back to FIG. 11, the complete query built at step 1108 is executed at step 1110. At step 1112, query results for the complete query are saved, for example, as a set of query results 1120, and processing returns to 1106 to build a complete query using the next combination of query conditions. After a complete query is built and executed for each combination of query conditions, the operations 1100 end at step 1114, at which time the query results 1120 may include a set of query results for each combination of query conditions.

For some embodiments, the operations 1100 may also include operations for displaying, analyzing or comparing the query results 1120 obtained for the different combinations of query conditions. For example, as illustrated in FIG. 13, the number of results 1330 returned for each combination of query results may be summarized in a simple table presented in a GUI screen 1300, which may be generated automatically after executing the parameterized query. The GUI screen 1300 may include columns 1310 and 1320 for each high level parameter marker. The GUI screen 1300 may provide a simple measure to determine if (or what type of) further analysis of the results 1120 is warranted.

According to different aspects, a runtime component for executing complete queries may be configured to perform a number of optimizations when executing a parameterized query. For example, for some embodiments, the runtime component may be configured to executed an initial query against a data source and receive a set of initial results. Assuming statements including the high level parameters are ANDed together it the query, the complete queries may be executed against the initial results, rather than the data source, which may greatly improve performance. For example, a removing the high level parameter markers from the parameterized query of TABLE VI may yield the base query:

TABLE VII

| BASE QUERY EXAMPLE | |
| --- | --- |
| 001 | Select * from patient_table where |
| 002 | (patient diagnosed with liver disease) |

The base query may be executed against a data source to get an initial set of results. Complete queries may then be executed against the initial set of results. For example, the base query above may be executed to get initial results including all patients diagnosed with liver disease. Concrete queries including search conditions related to age and gender may then be executed against these initial results. The initial results may be stored in temporary tables, for example, in system memory, which may be accessed much faster than the data source which may be, for example, a database located on a remote machine.

CONCLUSION

Queries built using high level parameter markers may facilitate data mining, trend analysis, and data warehouse exploration. By associating a batch of query conditions with high level parameter markers, a number of complete queries targeting different data groups may be generated from a single parameterized query. Reusable query components may also be associated with high level parameter markers, which may facilitate building complex queries using a potentially large number of query conditions. Further, by saving high level parameter markers and associated query conditions, parameter markers may be reused in different applications.

It should be noted that any reference herein to particular values, definitions, programming languages and examples is merely for purposes of illustration. Accordingly, the invention is not limited by any particular illustrations and examples. Further, while aspects of the invention are described with reference to SELECTION operations, other input/output operations are contemplated, including well-known operations such as ADD, MODIFY, INSERT, DELETE and the like. Of course, certain access methods may place restrictions on the type of abstract query functions that can be defined using fields that utilize that particular access method. For example, fields involving composed access methods are not viable targets of MODIFY, INSERT and DELETE.

While the foregoing is directed to embodiments of the present invention, other and further embodiments of the present invention may be devised without departing from the basic scope thereof, and the scope thereof is determined by the claims that follow.

What is claimed is:

1. A method for accessing data, comprising:
building a query with at least one parameter marker embedded therein;
associating a list of a plurality of query conditions with the parameter marker; and
programmatically building and executing a set of unique complete queries by, iteratively, for each query condition,
building a complete query by substituting the query condition for the parameter marker,
executing the complete query against a data source,
receiving results from executing the complete query,
storing the results from executing the complete query, and
presenting the results from executing the complete query to a user.

2. The method of claim 1, wherein associating a list of a plurality of query conditions with the parameter marker comprises associating at least one reusable query component with the parameter marker, wherein one or more query conditions are associated with the reusable query component.

3. The method of claim 2, wherein:
associating at least one reusable query component with the parameter marker comprises saving a link to the reusable query component; and
building the complete query comprises accessing the one or more query conditions associated with the reusable query component via the link.

4. The method of claim 1, wherein the parameter marker is associated with a particular category and associating a list of a plurality of query conditions with the parameter marker comprises associating only conditions based on logical fields related to the particular category.

5. The method of claim 1, further comprising executing an initial query and wherein the complete query built for each query condition is executed against results received from executing the initial query.

6. The method of claim 5, wherein the initial query is generated by removing the at least one parameter marker from the query built with at least one parameter marker embedded therein.

7. The method of claim 1, further comprising saving one or more query conditions associated with the parameter marker for later reuse.

8. The method of claim 1, wherein presenting results from executing the complete query to the user comprises displaying a table listing a number of results returned for each query condition substituted for the parameter marker.

9. The method of claim 1, wherein the one or more conditions associated with the parameter marker are defined by logical fields and the method further comprises mapping the logical fields to physical entities of data.

10. A computer-readable storage medium containing a program which, when executed by a processor, performs operations comprising:
receiving a query with parameter markers embedded therein, wherein a respective list of a set of query conditions is associated with each parameter marker, the respective list of a set of query conditions being separate from the received query;
programmatically generating combinations of query conditions, wherein each combination is generated iteratively by selecting a query condition from each list of a set of query conditions; and
for each combination of query conditions,
building a complete query by substituting the combination of query conditions for the parameter markers in the received query,
executing the complete query,
receiving results from executing the complete query,
storing the results from executing the complete query, and
presenting the results from executing the complete query to a user.

11. The computer-readable storage medium of claim 10, wherein the operations further comprise providing the user one or more graphical user interface (GUI) screens for generating the query with parameter markers embedded therein.

12. The computer-readable storage medium of claim 11, wherein the operations further comprise providing the user one or more graphical user interface (GUI) screens for associating query conditions with the parameter markers.

13. The computer-readable storage medium of claim 12, wherein the one or more graphical user interface (GUI) screens for associating query conditions with the parameter markers allow the user to associate query conditions with the parameter markers by specifying a reusable query component associated with one or more query component.

14. The computer-readable storage medium of claim 10, wherein the operations further comprise executing an initial query, receiving results from executing the initial query, and wherein the complete query built for each combination of query conditions is executed against results received from executing the initial query.

15. The computer-readable storage medium of claim 14, wherein the initial query is generated by removing the at least one parameter marker from the received query.

16. The computer-readable storage medium of claim 10, wherein presenting results from executing the complete query to the user comprises displaying a table listing a number of results returned for each query condition substituted for the parameter markers.

17. The computer-readable storage medium of claim 10, wherein one or more conditions associated with each parameter marker are defined by one or more logical fields and the operations further comprise mapping the one or more logical fields to physical entities of data.

18. A database system, comprising:
a graphical user interface (GUI) configured to receive, from a user, a query including at least one parameter marker and one or more query conditions associated with the parameter marker;
a query building component configured to build complete queries based on the received query by programmatically and iteratively substituting, for the parameter marker, the one or more query conditions associated with the parameter marker; and
a query executing component configured to:
execute the complete queries;
receive results from executing the complete queries;
store the results from executing the complete queries; and
present the results from executing the complete queries to a user.

19. The database system of claim 18, wherein the query executing component is further configured to determine if a statement containing the parameter marker is logically ANDed in the received query and, if so, to:

generate a base query by removing the statement including the parameter marker from the received query;
execute the base query against a data source;
receive results from executing the base query; and
execute the complete queries against the results received from executing the base query.

20. The database system of claim 18, wherein the list of the one or more query conditions associated with the parameter marker are abstract query conditions defined by one or more logical fields and the complete queries are abstract queries.

21. The database system of claim 20, further comprising:
a data repository abstraction component comprising mapping rules which map the one or more logical fields to physical entities of data; and
a runtime component for transforming the abstract queries into queries consistent with the physical entities of data according to the mapping rules.

* * * * *